(12) United States Patent
Yamada

(10) Patent No.: US 6,211,900 B1
(45) Date of Patent: Apr. 3, 2001

(54) RECORDING APPARATUS

(75) Inventor: Hideaki Yamada, Shimo suwa-machi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/331,101

(22) PCT Filed: Jan. 13, 1998

(86) PCT No.: PCT/JP98/00100

§ 371 Date: Jun. 16, 1999

§ 102(e) Date: Jun. 16, 1999

(87) PCT Pub. No.: WO99/21182

PCT Pub. Date: Apr. 29, 1999

(30) Foreign Application Priority Data

Oct. 16, 1997 (WO) ............................ PCT/JP98/03750

(51) Int. Cl.[7] .................................................. B41J 27/00
(52) U.S. Cl. ................................. 347/256; 347/241
(58) Field of Search ..................................... 347/256, 241, 347/238, 243, 244, 258, 259; 257/98, 88; 359/196, 642, 643

(56) References Cited

U.S. PATENT DOCUMENTS 4,209,793 * 6/1980 Ueno ................................. 250/204
5,161,046 * 11/1992 Ohshima et al. ................... 359/212
5,444,681 * 8/1995 Ishiwata et al. ..................... 369/32

FOREIGN PATENT DOCUMENTS

| 1-151428 | 10/1989 | (JP) . |
| 63-46311 | 10/1989 | (JP) . |
| 3-181032 | 8/1991 | (JP) . |
| 7-73491 | 3/1995 | (JP) . |

* cited by examiner

Primary Examiner—N. Le
Assistant Examiner—Lamson D. Nguyen
(74) Attorney, Agent, or Firm—Harness, Dickey & Pierce, P.L.C.

(57) ABSTRACT

A recording apparatus locates a photo detector at a predetermined position on an optical base, stopping the rotation of a resist master disk, activating a focusing laser, and optimally positioning a head by means of a head slider control circuit. The resist master disk then starts to rotate, followed by the starting of a focus servo circuit. A focus fine adjust circuit effects a fine movement of the photo detector using positioning data to achieve optimum focusing. A differential amplifier serves to cause a recording lens to adjust to nullify the error signal. Display information is compared with the focusing position data and, when the numerical information coincides with the focusing position data, the above-mentioned focusing data is used as optimum focusing position data for the initial setting of the optimum focusing position. The use of optimum focusing position data in the form of numerical values permits easy initial setting of the optimum focusing position for different types of resist master disks.

7 Claims, 5 Drawing Sheets

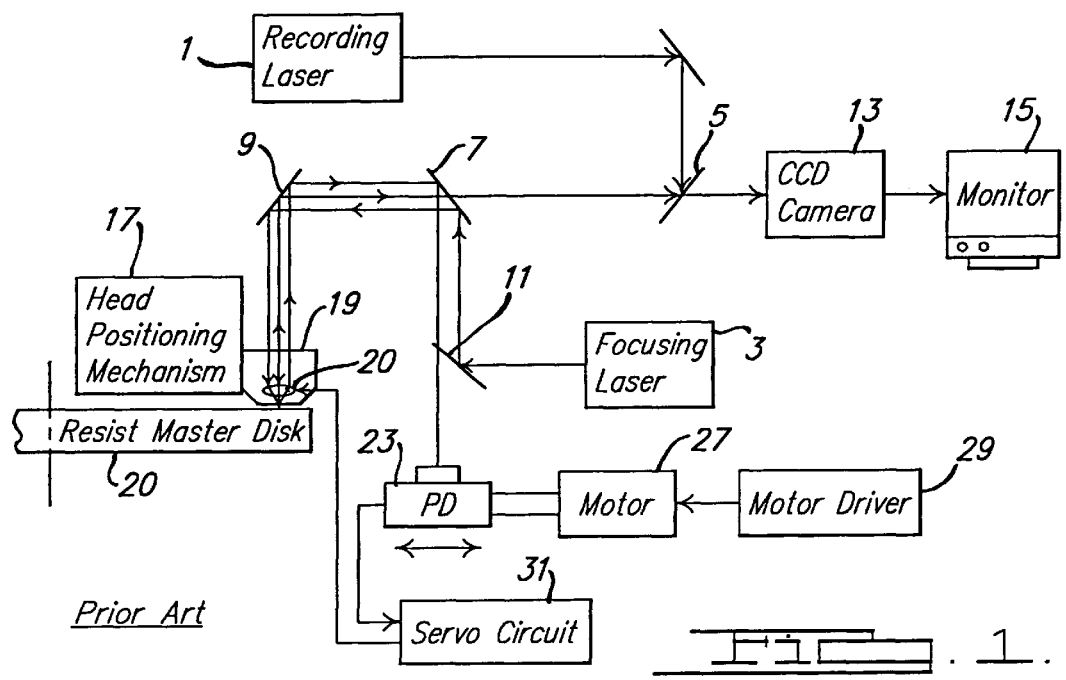
FIG. 1. *Prior Art*
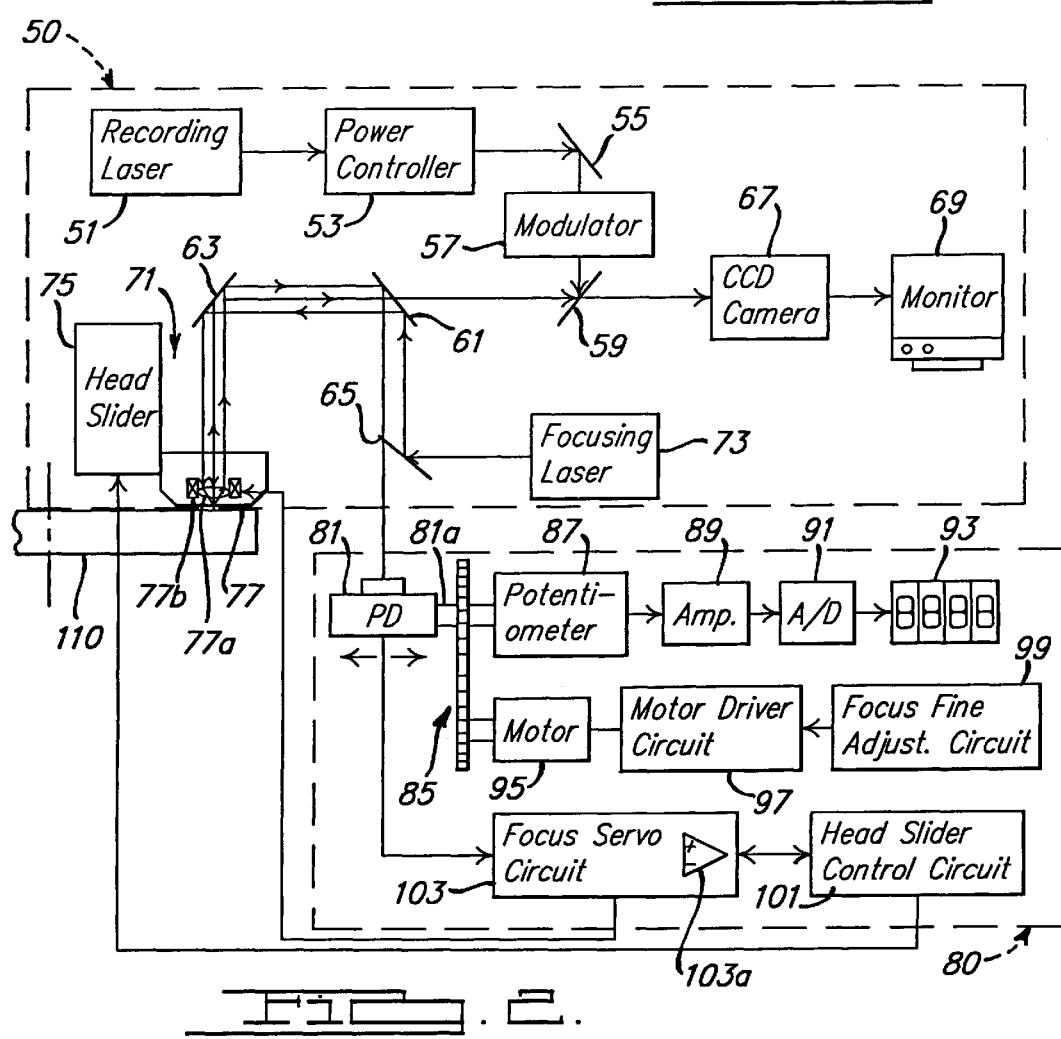
FIG. 2.

RECORDING APPARATUS

TECHNICAL FIELD

The present invention relates to an improvement in a laser cutting machine (referred to as a "recording apparatus", hereinafter).

BACKGROUND ART

A recording apparatus has been known which has, as shown in FIG. 1, a recording laser 1 and a focusing laser 3. In operation of this recording apparatus, initial setting of optimum focusing position of a recording lens 21 is performed in accordance with the following procedure. As the first step, a head 19 is positioned at an optimum position by means of a head positioning mechanism 17, while a resist master disk 20 is not rotating. Then, the master disk 20 is driven to rotate at a predetermined speed and, when the disk rotation has become steady at that speed, the recording laser 1 is activated so that recording laser light is made to be incident to the master disk 20 via mirrors 5, 7 and 9 and then through a recording lens 21. The laser light reflected by the master disk 20 runs backward along the same optical path as the incident light so as to impinge upon a CCD camera 13 from the mirror 5, whereby a laser spot image is formed on the monitor 15 through the camera 13. The operator, while visually observing the state of the laser spot image, controls a motor driver 29 so as to control a motor 27 thereby moving a photo-detector (PD) to the left and right. A servo circuit 31 performs a fine control of the position of the recording lens in the up and down directions so as to position the recording lens 21 at such a position that the above-mentioned laser light impinges upon the center of the PD 23 which is set at a position as a result of the above-mentioned control performed by the operator. This operation is repeated so that the recording lens 21 is set at the optimum focusing position.

In the above-described operation for initially setting the recording lens 21 at the optimum position, the laser spot image of the recording laser light displayed on the monitor 15 linearly changes in accordance with the movement of the PD 23, because the laser spot light is analog information. Considerably high degrees of skill and experience, therefore, are required in order to adequately position the recording lens 21 by visually finding the laser spot image corresponding to the optimum focusing position of the recording lens 21 through continuous visual chasing of the change in the laser spot image. The optimum focusing position of the recording lens 21 delicately varies according to the type of the resist master disk. Therefore, the above-described work is considerably troublesome even for skilled and experienced operators. Thus, it is not easy to position the recording lens 21 with a high degree of accuracy.

The described recording apparatus suffers from another disadvantage in that, even if the recording lens 21 has been set at the optimum focusing position, the data indicative of such optimum focusing position cannot be relied upon for the purpose of reproduction of the optimum focusing position, because the data is analog data which is in the form of the laser spot image displayed on the monitor 15 and cannot be stored.

Consequently, the above-described troublesome work is necessarily conducted each time the type of the resist master disk is changed, thus impairing the efficiency of the whole process.

Accordingly, an object of the present invention is to provide a recording apparatus in which the data indicative of the optimum focusing position of the recording lens is changed into numerical values so as to facilitate the work for initially setting the optimum focusing position of the recording lens for each type of resist master disk.

DISCLOSURE OF THE INVENTION

To this end, the present invention provides a recording apparatus for exposing a resist master disk to a recording laser light through a recording lens which has been set at an optimum focusing position, comprising: displaceable laser light detecting means for receiving a focusing laser light which has been applied to and reflected from the resist master disk during initial setting of the optimum focusing position, and for producing a detection signal indicative of the amount of deviation, from a predetermined light receiving position, of the light receiving position where the reflected focusing laser light is received; servo means responsive to the detection signal so as to automatically adjust the relative position of the recording lens with respect to the resist master disk in such a manner as to eliminate the deviation, thereby setting the recording lens at the optimum focusing position; displacement amount detecting means for detecting the amount of displacement of the laser light detecting means; and display means for changing the output from the displacement amount detecting means into numerical values and displaying the numerical values.

According to the features of the recording apparatus set forth above, the amount of displacement of the laser light detecting means acquired in the course of an initial setting performed by a skilled operator is changed into a numerical value which can be relied upon in the next initial setting of the optimum focusing position. The next initial setting, therefore, can easily be conducted even by an operator who is not so skilled. By holding the numerical optimum focusing position data for each of a plurality of types of resist master disks, initial setting of the optimum focusing position can easily be executed each time a different type of resist master disk is used, thus achieving a further improvement in the efficiency of the whole process.

Preferably, the recording apparatus in accordance with the present invention further comprises: reference displacement amount setting means in which a reference displacement amount has been set in terms of the amount of the displacement required to obtain coincidence between the light receiving position at which the focusing laser light is received and the reference light receiving position under such a condition that the recording lens has been set at the optimum focusing position; and automatic displacement amount adjusting means for automatically adjusting the displacement amount of the laser light detecting means such that the detection output from the displacement amount detecting means coincides with the reference displacement amount.

Thus, a preferred form of the recording apparatus in accordance with the present invention has reference displacement amount setting means and automatic displacement amount adjusting means.

The reference displacement amount setting means sets a reference displacement amount in terms of the amount of displacement required for achieving coincidence between the light receiving position at which the focusing laser light is received and the reference light receiving position under such a condition that the recording lens has been set at the optimum focusing position. The automatic displacement amount adjusting means automatically adjusts the amount of the displacement of the laser light detecting means such that the detection output from the displacement amount detecting means coincides with the reference displacement amount.

In the preferred form of the present invention set forth above, the amount of displacement of the laser light detecting means is automatically adjusted such that the detected displacement amount coincides with the reference displacement amount. Thus, the amount of displacement of the laser light detecting means can be automatically adjusted without troubling the operator.

BRIEF DESCRIPTION OF THE DRAWINGS

FIG. 1 is a block diagram showing the whole structure of a known recording apparatus.

FIG. 2 is a block diagram showing the whole structure of a first embodiment of the recording apparatus.

Figure 3:
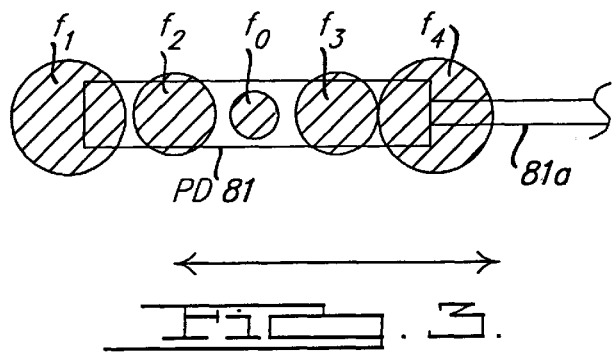
FIG. 3 is an illustration of the positional relationship between a photo-detector and a spot formed by a focusing laser light.

| Reference Numerals: | |
| --- | --- |
| 61, 63, 65 | mirror |
| 69 | monitor |
| 71 | head mechanism |
| 73 | focusing laser |
| 75 | head slider |
| 77 | head |
| 77a | recording lens |
| 77b | VCM |
| 81 | photo-detector |
| 85 | reduction gear mechanism |
| 87 | potentiometer |
| 93 | digital display unit |
| 95 | motor |
| 97 | motor driver circuit |
| 99 | focus fine adjusting circuit |
| 101 | head slider control circuit |
| 103 | focus servo circuit |
| 103a | differential amplifier |
| 105 | optimum focusing position confirming circuit |
| 107 | manual switch |
| 110 | resist master disk |

THE BEST MODE FOR CARRYING OUT THE INVENTION

Preferred embodiments of the present invention will now be described with reference to the accompanying drawings.

FIG. 2 is a block diagram showing the whole structure of a first embodiment of the recording apparatus.

As will be seen from this Figure, the recording apparatus has an optical system 50 and a focus servo system 80 which causes a recording lens 77a of the optical system 50 to follow up a resist master disk 110 with an accuracy on the order of sub-microns. The recording apparatus further has a shifting mechanism (not shown) which drives the resist master disk 110 at a high degree of rotational recision and causes a relative movement between the resist master disk 110 and the optical system 50, as well as a signal processing circuit (not shown) which includes circuits such as a modem circuit which performs modulation and demodulation of a signal indicative of the recorded information.

The optical system 50 includes a recording laser 51, a power controller 53, a mirror 55, a modulator 57, mirrors 59 to 65, a CCD camera 67, a monitor 69, a head mechanism 71 and a focusing laser 73.

The focus servo system 80 includes a photo-detector (PD) 81, a reduction gear mechanism 85, a potentiometer 87, an amplifier 89, an A/D converter 91, and a digital display unit 93. The focus servo system 80 further has a motor 95, a motor drive circuit 97, a focus fine adjusting circuit 99, a head slider control circuit 101, and a focus servo circuit 103.

The above-described components of the optical system 50, as well as the PD 81, potentiometer 87 and the motor 95 which are components of the focus servo system 80, are disposed on predetermined positions of a single optical base (not shown). As will be seen from the Figure, the PD 81 is movable to the left and right on the optical base.

A description will now be given of each of the components of the optical system 50.

The recording laser 51 functions as a source of recording light and also as a source of control signal light. The recording laser 51 is, for example, a He—Cd laser which emits the laser light of a wavelength $\lambda$ ($\lambda$=441.6 nm) as the recording laser light. The power controller 53 directs the laser light coming from the recording laser 51 to the mirror 55 and controls the intensity of the laser light from the recording laser 51 upon receipt of a detection signal from a photo-detector (not shown) for detecting a portion of the laser light which runs straight after being transmitted through the mirror 55. The modulator 57 may be, for example, an acoustic optical effect (A/O) light modulator which uses the correlation between acoustic wave and light wave propagated through a medium. The modulator 57 receives the laser light which has been emitted from the recording laser 51 through the power controller 53 and guided by the mirror 55, and modulates the received laser light in accordance with the information signals to be recorded and in accordance with a control signal. The modulated laser light is emitted to the mirror 59.

The recording laser light coming from the modulator 57 is made to be incident to the resist master disk 110 via the dichroic mirror 61, mirror 63 and a recording lens 77a of the head mechanism 71. The recording laser light reflected by the resist master disk 110 runs backward along the same light path as that of the incident laser light. The mirror 59 also serves to guide this reflected laser light to the CCD camera 67. In this embodiment, a polarization beam splitter (PBS) is used as the mirror 59.

The head mechanism 71 has a head 77 and a head slider 75 which holds the head 77 in such a manner that the head 77 is slidable downward from a home position which is about 30 mm spaced apart from the resist master disk 110.

More specifically, the head slider 75 under the control of the head slider control circuit 101 causes the head 77 to slide up and down over a stroke of several tens of millimeters with the upper stroke end set to the above-mentioned home position. The head slider 75, when the resist master disk 110 is not rotating, sets the head 77 at a position where the recording lens 77a can be adjusted to a "just focus" position. (This position of the head 77 is referred to as an "optimum position" of the head 77). The head position where the recording lens 77a (referred to as "optimum focusing position") is at the "just focus" position (this position will be referred to as an "optimum focusing position") may deviate from the optimum position of the head 77 by amounts which are on the order of several μm, due to waving of the surface of the resist master disk 110 due to rotation of the same. However, the head slider 75 is incapable of performing any control which would follow up and compensate for this variation of the head position, because it has inferior response characteristic.

The head 77 has the recording lens 77a and a voice coil motor (VCM) 77b which surrounds the recording lens 77a and which is capable of moving the recording lens 77a up and down over a stroke of 50 μm within the body of the head.

A stop aperture lens having a numerical aperture NA of 0.9 is conveniently used as the recording lens 77a. In this case, the focal depth h (h=λ/(NA)) is very small. When the recording laser light is applied, therefore, it is necessary that the position of the recording lens 77a is so adjusted that the surface of the resist master disk 110 to be exposed is disposed within the focal depth h.

The VCM 77b operates under the control of the focus servo circuit 103 so as to adjust, after the head 77 has been set to the optimum position of the head 77, the relative position of the recording lens 77a in the head body so as to set the recording lens 77 at the optimum focusing position, by following up any variation of the optimum focusing position due to waving of the surface of the resist master disk 110 during rotation of the disk 110.

The focusing laser 73 functions as a source of error detecting light which is used in the focusing operation. For instance, a He—Ne laser which is capable of emitting a laser light of a wavelength of λ=632.8 nm is used as the focusing laser 73. The laser light emitted from the focusing laser 73 is reflected by the mirror 65 and is guided to the resist master disk 110 via the dichroic mirror 61, mirror 63 and the recording lens 77a. The laser light reflected by the resist master disk 110 is guided back to the mirror 65 via the recording lens 77a, mirror 63 and the dichroic mirror 61. The mirror 65 transmits only the reflected laser light which serves as the focusing laser light, while reflecting the reflected laser light which serves as the recording laser light. Consequently, only the focusing laser light reflected from the resist master disk 110 is allowed to reach the photo-detector (PD) 81 which is a component of the focus servo system 80. In this embodiment, a polarization beam splitter (PBS) is used as the mirror 65, as is the case of the aforesaid mirror 59.

The CCD camera 67 generates electrical signals indicative of the spot image formed by the recording laser light which is incident to the CCD camera 67 through the mirror 59, and delivers the electrical signals to the monitor 69, whereby the spot image is displayed on the monitor 69 for visual observation by the operator.

A description will now be given of the components of the focus servo system 80.

The PD 81 is a linear position detecting sensor or a split-type sensor having a planar form as shown in FIG. 3 and movable to the left and right by a drive shaft 81a.

The drive shaft 81a has a screw thread formed on the outer peripheral surface thereof serving as a feed screw which makes a screwing engagement with the body of the PD. The drive shaft 85 has a reduction gear mechanism 85 and a potentiometer 87. The arrangement is such that the forward and backward rotation of the shaft of the motor 95 is transmitted to the drive shaft 81a through the reduction gear mechanism 85, so that the body of the PD is moved to the left and right as viewed on FIG. 2 (FIG. 3).

The position detecting sensor or the split-type photo-diode has a detecting region which extends in the longitudinal direction thereof, i.e., horizontally, as viewed on FIG. 3. The position detecting sensor is divided into two sections: namely, a section which has a photo-diode disposed on the right side of the center of the sensor shown in FIG. 3 (this photo-diode will be referred to as "right photo-diode", hereinafter) and a section which has a photo-diode disposed on the left side of the center of the sensor (this photo-diode will be referred to as "left photo-diode"). Each of the left and right photo-diodes has an output terminal. (The output terminal of the right photo-diode will be referred to as a "right output terminal", while the output terminal of the left photo-diode will be referred to as a "left output terminal". Both terminals are not shown. Thus, the position detector sensor used in this embodiment has the form of a split photo-diode which produces at its left and right output terminals positive voltages which are used as the light detection signals.

More specifically, referring to FIG. 3, when the beam spot of the focusing laser light impinging upon the position detecting sensor through the mirror 65 is formed at a position $f_3$ which belongs to the detection region of the right photo-diode, a comparatively high positive voltage signal is obtained at the right photo-diode, while a comparatively low positive voltage is delivered from the left output terminal. If the beam spot is formed at a position $f_4$ which is on the right side of the above-mentioned position $f_3$, a positive voltage which is higher than that obtained when the beam spot is at the position $f_3$ is delivered from the right output terminal, whereas the left output terminal delivers a positive voltage which is lower than that obtained when the beam spot is at the position $f_3$.

Conversely, when the beam spot is located at a position $f_2$ which is within the detection region of the left photo-diode, the relationship between the voltage signals from the left and right output terminals is reverse to that obtained when the beam spot is at the position $f_3$. Similarly, when the beam spot is at a position $f_1$ which is on the left side of the position $f_2$, the relationship between the voltage signals from the left and right output terminals is reverse to that obtained when the beam spot is at the position $f_4$.

When the beam spot is located at the central position $f_0$ on the PD 81 shown in FIG. 3, positive voltages of the same level are obtained at the left and right output terminals. The central position $f_0$ is a position which may correspond to the optimum focusing condition, i.e., the just focusing state of the recording lens 77a, depending on the position of the PD 81 relative to the optical base, whereas other positions offset from the center such as $f_1$, $f_2$, $f_3$ and $f_4$ may correspond to defocus states of the recording lens 77 depending on the position of the PD 81 relative to the optical base. Thus, when the beam spot is located at a position such as one of $f_1$ to $f_4$ which is offset from the central position $f_0$, the position of the recording lens 77a is automatically adjusted by the focus servo circuit 103 and the VCM 77b, such that the beam spot impinges upon the central position of shown in FIG. 3, regardless of the position of the PD 81 relative to the optical base. Obviously, the positive voltage signals delivered from the left and right output terminals may be substituted by negative voltage signals.

The light detection signals from the left and right output terminals of the above-mentioned split photo-diode are delivered to a differential amplifier 103a of the focus servo circuit 103.

Referring back to FIG. 2, a multi-rotation potentiometer which converts rotation angle to a voltage is used as the potentiometer 87. The multi-rotation potentiometer detects the amount of rotation of the drive shaft 81 and delivers a voltage signal corresponding to the rotation amount to the amplifier 89. The amplifier 89 amplifies the voltage signal from the potentiometer 87 at a predetermined amplification factor and delivers the amplified voltage signal to the A/D converter 91. The A/D converter 91 converts the voltage signal (analog signal) to a digital signal and delivers the digital signal to the digital display unit 93.

The digital display unit 93 has a plurality of display places each being composed of seven segments. The segments of each place are selectively driven in accordance with the digital information given by the A/D converter 91, so as to be displayed as numerical information.

The numerical information represents the distance between the instant position of the PD 81 relative to the optical base during the operation of the VCM 77b for setting the recording lens 77a to the optimum focusing position with respect to the rotating resist master disk 110 from a reference position of the PD 81. The reference position of the PD 81 is, for example, the position taken by the PD 81 when the head 77 has been set to its optimum position with respect to the resist master disk 110 while the disk 110 is not rotating. The numerical information varies depending on the type of the resist master disk 110 which is to be subjected to the cutting, and is used as the initial value to be set by the apparatus of the invention for each type of the resist master disk. The manner of the initial setting will be described later in detail.

The motor 95 is a reversible motor which can rotate both forward and backward, and is driven by the motor driver circuit 97. The focus fine adjust circuit 99 performs fine focusing control of the recording lens 77a by finely moving the PD 81 to the left and right as viewed in FIG. 2 or FIG. 3, through the operation of the focus servo circuit 103 and the VCM 77b. To this end, the focus fine adjust circuit 99 supplies the motor driver circuit 97 with a control signal for effecting an inching or fine driving of the motor 95. The focus fine adjust circuit 99 has an operating portion (not shown) which enables the operator to set the amount of leftward or rightward movement of the PD 81.

The head slider control circuit 101 is a component which is activated prior to operation of other components, for commencing the initial setting of the optimum focusing position for each type of the resist master disk, or for commencing the focusing operation of the apparatus of the invention (shown in FIG. 2) for the purpose of exposing the resist master disk 110. More specifically, the head slider control circuit 101 controls, when the resist master disk 110 is not rotating, the head slider 75 by making reference to an error signal (described later) which is generated by an error signal generating means such as the differential amplifier 103 based on the light detection signal derived from the PD 81 which has been located at a predetermined position on the optical base. As a result of this control, the head 77 is lowered to a predetermined optimum position from the home position (a position which is approximately 30 mm above the surface of the resist master disk 110).

As described before, the focus servo circuit 103 incorporates the differential amplifier 103a, and is started automatically or by a manual operation of the operator, after completion of the setting of the head 77 to its optimum position performed by the head slider control circuit 101. During the rotation of the resist master disk 110, the focus servo circuit 103 performs fine adjustment of the position of the recording disk 77a by controlling the VCM 77b based on the light detection signal derived from the PD 81 which has ben adjusted leftward or rightward by the operation of the focus fine adjust circuit 99.

This operation will be described more specifically. It is assumed here that the PD 81 has been located at a certain position on the optical base. The differential amplifier 103a produces a positive or negative voltage difference (error signal) based on the difference between the voltages derived from the aforesaid two output terminals. A positive sign of the voltage difference means that the beam spot of the focusing laser light is located within the detection region of the right photo-diode of the PD 81, i.e., a position such as $f_3$ or $f_4$ shown in FIG. 3. In such a case, the focus servo circuit 103 performs such a control as to move the recording lens 77a up or down by an amount of several $\mu$m, through the operation of the VCM 77b, until the above-mentioned voltage difference is reduced to 0 (zero), thereby bringing the beam spot to the position $f_0$. Conversely, a negative sign of the voltage difference between the voltage signals derived from the two output terminals means that the beam spot of the focusing laser light is located within the detection region of the left photo-diode of the PD 81, i.e., a position such as $f_1$ or $f_2$ shown in FIG. 3. In this case also, the focus servo circuit 103 performs such a control as to move the recording lens 77a up or down, through the operation of the VCM 77b, thereby bringing the beam spot to, for example, the position $f_0$ shown in FIG. 3.

As a consequence, the position of the recording lens 77a is automatically controlled such that the beam spot of the focusing laser light is located on the central position $f_0$ on the PD 81, even when the beam spot has been offset to a position such as $f_1$, $f_2$, $f_3$ or $f_4$ as a result of setting of the PD 81 at a position after a minute movement of the same from the aforementioned certain position.

Figure 5:
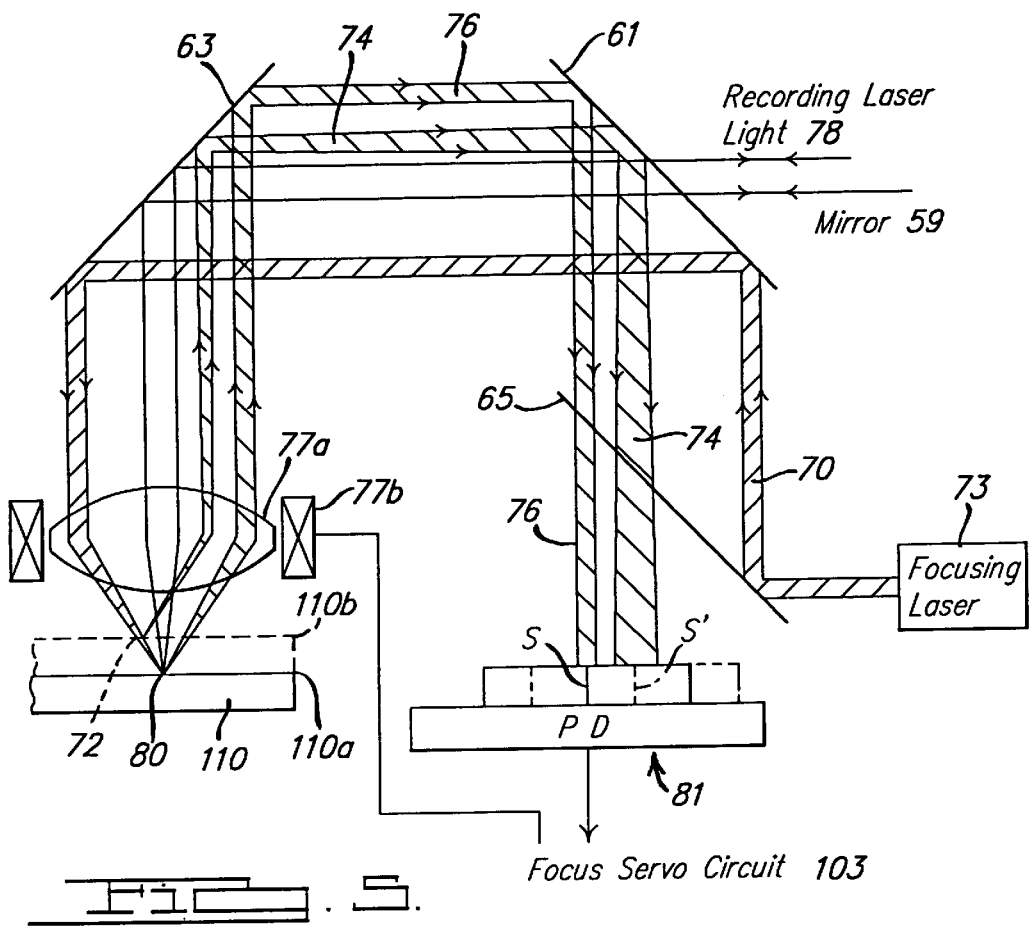
FIG. 5 is an illustration of a focusing error detecting system using a focusing laser light for detecting the focusing error of a recording lens.

It is assumed, by way of example, that the head 77 has been set to a position as shown in FIG. 5 by the operation of the head slider control circuit 101, while the PD 81 has been set such that its center is located at a position S' shown in FIG. 5. It is also assumed that the position of the exposure surface of the resist master disk has been shifted to a position indicated by 110b due to waving of the resist master disk 110 which is rotating. In such a case, the beam 70 of the focusing laser is reflected by the exposure surface which is indicated by 72 and is guided to the PD 81 in the manner shown by the numeral 74. Therefore, the cutting is performed by the recording laser light 78 while the latter is in a defocus state.

In this case, the focus servo circuit 103 performs a fine adjustment such that the recording lens 7a is moved away from the resist master disk 110, on condition that the position of the PD 81 is reset such that its center is located at the position indicated by S. Consequently, the position of the exposure surface of the resist master disk 110 relative to the recording lens 77a is changed from the position 110b to a position indicated by 110a. As a result, the beam 70 of the focusing laser light is reflected by the exposure surface denoted by 80 and impinges upon the PD 81, whereby the cutting is performed by the recording laser light 78 which is in the "just focus" state, i.e., with the recording lens 77a located at the optimum focusing position. The potentiometer 87 detects the amount of the displacement of the PD 81 from the position where the center of the PD 81 is located at the position S' to the position where the center of the PD 81 is located at the position S. According to a major feature of this embodiment, the displacement amount detected by the potentiometer 87 is displayed in the form of digital data.

Obviously, there may be a type of resist master disk with which the optimum focusing position of the recording lens 77a is located at the position indicated by 110b.

Figure 4:
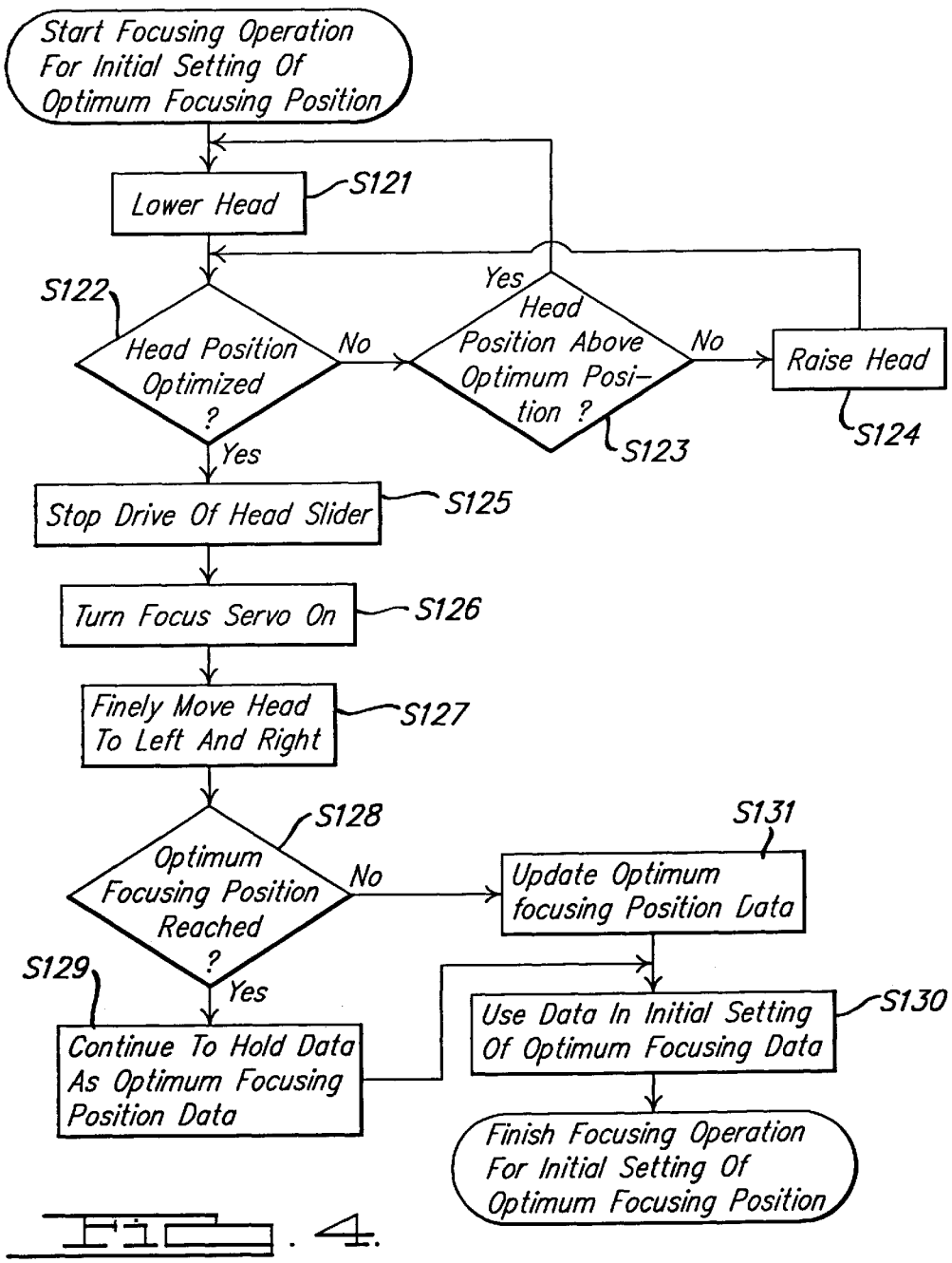
FIG. 4 is a flow chart showing a focusing process performed in the first embodiment of the recording apparatus.

A description will now be given of the focusing process for initially setting the optimum focusing position of the recording lens 77a, with reference to the flowchart shown in FIG. 4.

The process which will now be described uses focusing position data which are deemed to be optimum focusing position data which have been acquired through a manual operation executed by a skilled operator. (Such focusing position data will be referred to as "predicted optimum focusing position data".)

At the beginning of the focusing process, the operator locates the PD 81 at a predetermined position on the optical base. Then, the focusing laser 73 is started, while the resist master disk 110 is kept from rotating. Then, driving instructions are given to the head slider control circuit 101 which in turn controls the head slider 75 so as to lower the head 77 (Step S121). During this operation, the head slider control circuit 101 periodically and cyclically checks whether or not the head has reached a predetermined optimum position, by making reference to an error signal derived from, for example, the differential amplifier 103a (Step S122).

When the result of the periodical check shows that the head 77 is still above the optimum position (Step S123), the downward movement of the head 77 is continued (Step S121), whereas, when the result shows that the head 77 has come down below the optimum position (Step S123), the head slider control circuit 101 terminates the downward motion of the head 77 and, instead, commences upward movement of the head 77 (Step S124). It is to be noted that the operator is prohibited from starting the focus servo circuit 103 during execution of the above-described control operation performed by the head slider control circuit 101. When it is judged that the head 77 has reached the above-mentioned optimum position (Step S122), the head slider control circuit 101 terminates the driving of the head slider 75 (Step S125).

The focus servo circuit 103 is started (Step S126) when it is determined after the start of rotation of the resist master disk 110 that the above-mentioned optimum position of the head 77 cannot locate the recording lens 77a at the optimum focusing position. The operator then sets, through the operating portion of the focus fine adjust circuit 99, an amount of fine movement of PD which corresponds to the aforesaid predicted optimum focusing position data, so that the focus fine adjust circuit 99 finely drives the PD 81 to the left or right (Step S127). The difference between the voltage signals derived from the two output terminals of the PD 81 varies partly because of a waving of the disk surface due to rotation of the resist master disk 110 and partly because of the above-described fine movement of the PD 81. In order to compensate for this variation, the focus servo circuit 103 causes the recording lens 77a to move up or down by an amount of several $\mu$m, so as to reduce the voltage difference to 0 (zero). It is possible that the relative position of the recording lens 77a in the head 77, as obtained after the above-described adjustment for reducing the voltage difference to 0, is the optimum focusing position under rotation of the resist master disk 110. The operator then compares the numerical information displayed on the digital display unit 93 with the above-mentioned predicted optimum focusing position data (Step S128). If the displayed numerical information coincides with the predicted optimum focusing position data, the predicted optimum focusing data is held as being the optimum focusing data (Step S129) and is used as the data for initial setting of the optimum focusing position (Step S130).

Conversely, if the comparison conducted in Step S128 has proved that the displayed numerical data does not coincide with the predicted optimum focusing position data, the predicted optimum focusing position data is updated by being substituted by the displayed numerical information (Step S131). The process then proceeds to Step S130.

By repeating several times the operation of the steps S121 to S131, it is possible to acquire optimum focusing position data for each of the different types of resist master disks.

Thus, in the described embodiment of the invention, optimum focusing position data corresponding to the type of the resist master disk 110 to be processed is selected prior to the exposure of the resist master disk 110, and the optimum focusing position of the recording lens 77a is initially set based on the selected optimum focusing position data, whereby the variation of shapes of the bits or grooves formed in the replicated disk can be reduced as compared with the known arts.

A description will now be given of the result of a comparison between the variation of the relationship between the depth and width of the bits (or grooves) formed in a disk replicated from the resist master disk prepared in accordance with the described embodiment and the variation of the relationship between the depth and width of the bits (or grooves) formed in another disk replicated from a resist master disk prepared in accordance with a known technique.

Figure 6:
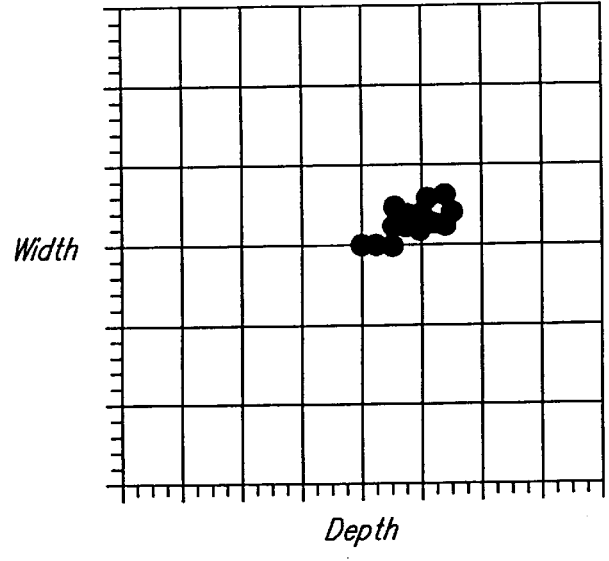
FIG. 6 is a chart illustrative of variations of the relationship between the depth and breadth of bits (or grooves) formed in a disk which is produced by copying the resist master disk produced by the first embodiment.
Figure 7:
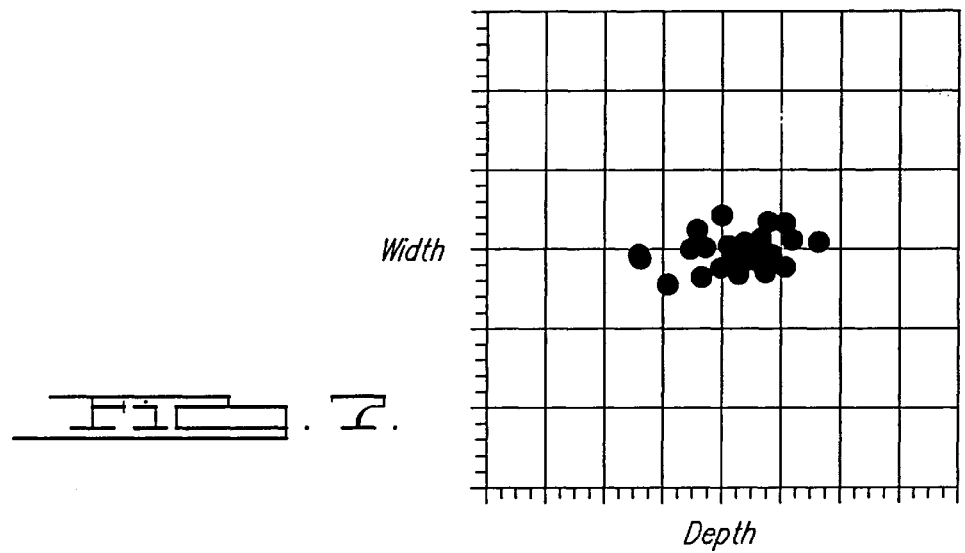
FIG. 7 is a chart illustrative of variations of the relationship between the depth and breadth of bits (or grooves) formed in a disk which is produced by copying a resist master disk produced by a known process.

FIG. 6 shows the variation of the relationship between the depth and width of the bits (or grooves) formed in a disk replicated from the resist master disk 110 prepared in accordance with the described embodiment, while FIG. 7 shows the variation of the relationship between the depth and width of the bits (or grooves) formed in a disk replicated from the resist master disk prepared in accordance with the known technique.

In each of FIGS. 6 and 7, axis of ordinate represents the width, while abscissa represents the depth, of the bits (or grooves). A certain relationship exists between the depth and width of bits (or grooves): namely, the greater the depth, the greater the width. This constant relationship is maintained only when the fluctuation of the focusing position of the recording lens 77a is small. Thus, the relationship is varied when the focusing position of the recording lens 77a fluctuates.

FIG. 6 shows the variation of the relationship obtained in a case where the fluctuation of the focusing position of the recording lens 77a is small, while FIG. 7 shows the variation observed when the fluctuation of the focusing position of the recording lens 77a is significant. A comparison between the data shown in FIG. 6 and those shown in FIG. 7 clearly demonstrates that the variation of the relationship between the depth and width of the bits (grooves) is smaller in the disk replicated from the resist master disk 110 prepared in accordance with the embodiment than in the disk replicated from the master disk prepared in accordance with the known technique.

Figure 8:
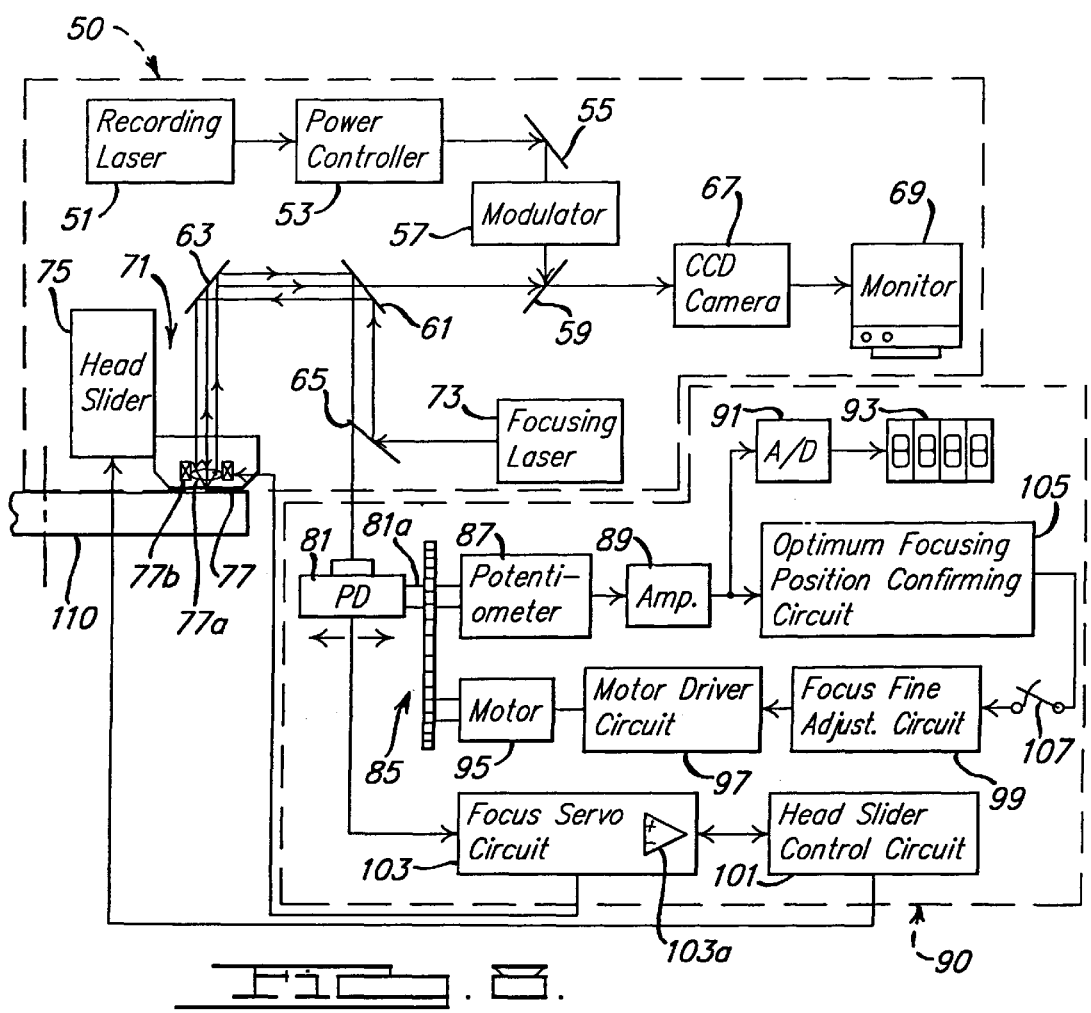
FIG. 8 is a block diagram showing the whole structure of a second embodiment of the recording apparatus.

FIG. 8 is a block diagram showing the whole structure of a recording apparatus in accordance with a second embodiment of the present invention.

As will be seen from this Figure, the recording apparatus of the second embodiment differs from the recording apparatus of the first embodiment in that the former has an optimum focusing position confirming circuit 105 and a manually operable switch 107 which are connected between the output of the amplifier 89 and the input of the focus servo circuit 103.

Other features of the second embodiment are the same as or similar to those of the first embodiment and, therefore, are not described to avoid duplication of explanation.

Figure 9:
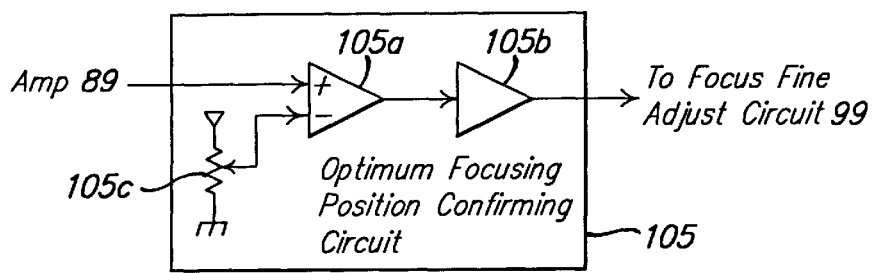
FIG. 9 is a block diagram showing the internal structure of an optimum focusing position confirming circuit incorporated in the apparatus shown in FIG. 8.

The optimum focusing position confirming circuit 105 has a function substantially equivalent to the operating portion of the focus fine adjust circuit 99 employed in the first embodiment, and is used in the operation for the initial setting of the optimum focusing position. The optimum focusing position confirming circuit 105 has, as shown in FIG. 9, a differential amplifier 105a, a reference voltage setting circuit 105c connected to the inversion input terminal of the differential amplifier 105a, and an amplifier 105b having a buffering function.

A variable resistance circuit capable of dividing a voltage into desired voltages is used as the reference voltage setting circuit 105c. More specifically, the reference voltage setting circuit 105c has a slider which is operable by the operator, thus enabling the operator to set a reference voltage corresponding to the amount of fine movement of the PD 81 indicative of the predicted optimum focusing position data.

The differential amplifier 105a computes the difference between the output signal derived from the amplifier 89 and the reference voltage applied by the reference voltage setting circuit 105c, and produces a voltage signal (error signal) corresponding to the voltage difference. The error signal is delivered to the focus fine adjust circuit 99 only when the switch 107 has been closed. The focus fine adjust circuit 99, upon receipt of the error signal, controls the motor 95 through the operation of the motor drive circuit 97, thus effecting a fine movement of the PD 81 to the left or right.

The switch 107 is manually closed by the operator only when the initial setting of the optimum focusing position is conducted by means of the optimum focusing position confirming circuit 105. This switch 107, therefore, is opened once the initial setting of the optimum focusing position is completed.

Figure 10:
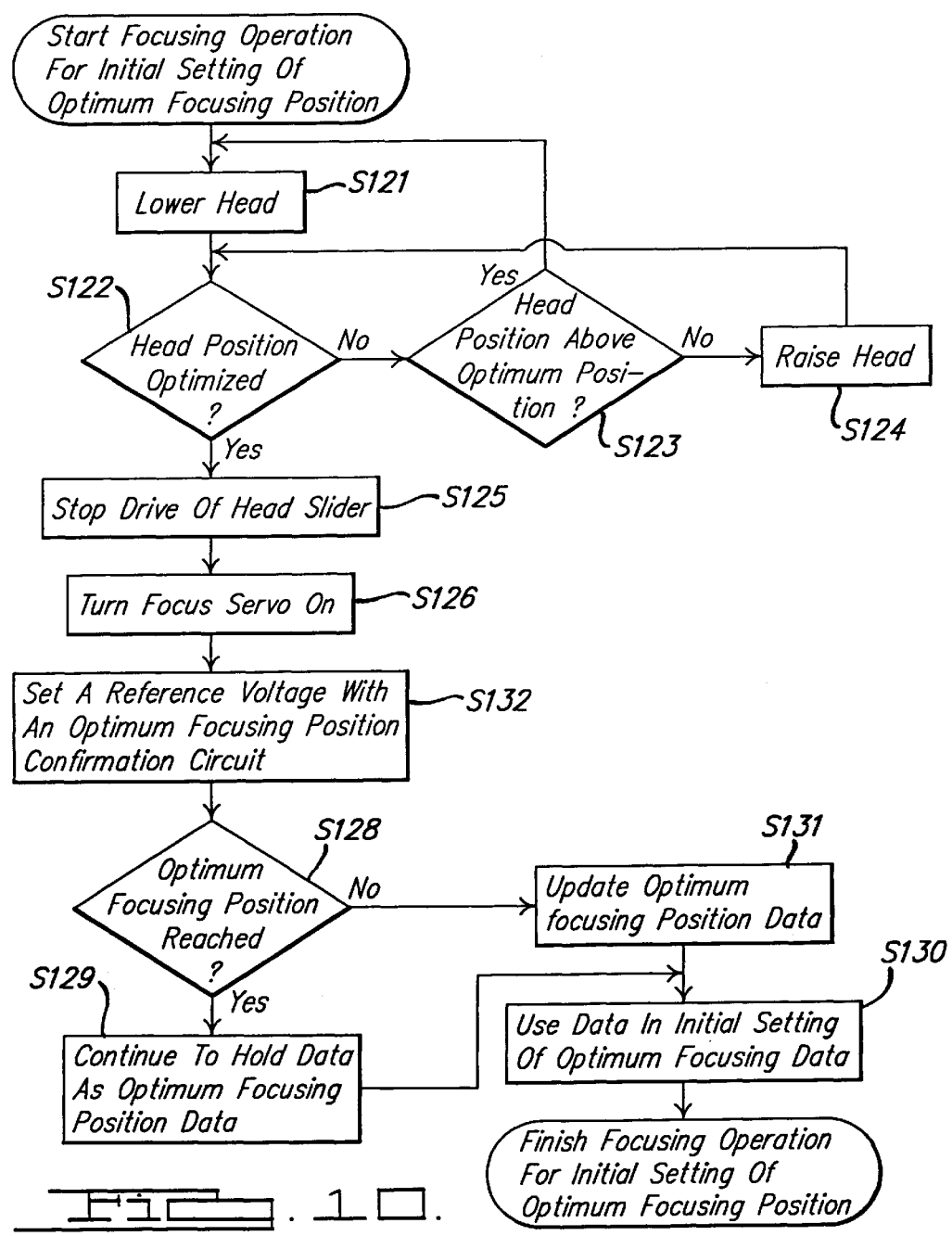
FIG. 10 is a flow chart showing a focusing process performed in the second embodiment of the recording apparatus.

FIG. 10 is a flowchart showing the focusing process conducted for the purpose of initial setting of the optimum focusing position of the recording lens 77a in the recording apparatus of the second embodiment. This process is discriminated from the process of FIG. 4 only by the operation performed in Step S127 and the operation performed in Step S123, as will readily be seen from the comparison between the flow charts of FIGS. 4 and 10.

More specifically, referring to FIG. 10, the focus servo circuit 103 is started (Step S126) and then a reference voltage corresponding to the predicted optimum focusing position data is set by the reference voltage setting circuit 105c (Step S132) while the switch 107 is kept open. Then, the switch 107 is closed, so that the motor 95 is controlled in accordance with the signal which indicates the difference between the output signal from the amplifier 89 and the reference voltage and which is computed by the differential amplifier 105a, whereby the PD 81 is finely moved to the left or right. Thereafter, operations described before are executed including the adjusting operation for adjusting the recording lens 77a up or down by the amount of several $\mu$m performed by the focus servo circuit 103, as well as the checking executed by the operator as to whether the optimum focusing position has been reached.

The apparatus of the second embodiment offers substantially the same advantages as those of the apparatus of the first embodiment.

Although the invention has been described through illustration of specific embodiments, it will be understood that the described embodiments are not intended to limit the scope of the present invention.

As has been described, the present invention provides a recording apparatus which permits easy initial setting of the optimum focusing position suitable for the type of the resist master disk to be processed, by virtue of the feature that the data indicative of the optimum focusing position of the recording lens is handled in the form of numerical values.

INDUSTRIAL APPLICABILITY

The recording apparatus of the present invention can suitably be used as a laser cutting machine.

What is claimed is:

1. A recording apparatus for exposing a resist master disk to a recording laser light through a recording lens which has been set at an optimum focusing position, comprising:

displaceable laser light detector for receiving a focusing laser light which has been applied to and reflected from said resist master disk during initial setting of the optimum focusing position, and for producing a detection signal indicative of an amount of deviation, from a predetermined light receiving position, of a light receiving position where a reflected focusing laser light is received;

a servo responsive to said detection signal so as to automatically adjust a relative position of said recording lens with respect to said resist master disk in such a manner as to eliminate said deviation, thereby setting the recording lens at the optimum focusing position;

displacement amount detector for detecting an amount of displacement of said laser light detector; and a display for changing an output from said displacement amount detector into numerical values and displaying the numerical values.

2. A recording apparatus according to claim 1, further comprising:

reference displacement amount setter in which a reference displacement amount has been set in terms of an amount of displacement required to obtain coincidence between said light receiving position at which the focusing laser light is received and said reference light receiving position under such a condition that said recording lens has been set at the optimum focusing position; and automatic displacement amount adjustor for automatically adjusting the amount of displacement of said laser light detector such that a detection output from said displacement amount detector coincides with said reference displacement amount.

3. A recording apparatus comprising:

a recording lens for focusing laser light;

a resist master disk disposed proximate the recording lens to receive and reflect the laser light;

a displaceable laser light detector disposed proximate the resist master disk to receive the laser light reflected therefrom, the displaceable laser light detector generating a motion signal corresponding to an amount of deviation of the laser light from a pre-selected position; and a servo coupled to the recording lens and communicating with the displaceable laser light detector, the servo automatically adjusting a position of the recording lens relative to the resist master disk in response to the motion signal from the displaceable laser light detector so as to achieve an optimum focusing position.

4. The apparatus of claim 3 further comprising:

a displacement detector communicating with said displaceable laser light detector and generating a displacement output corresponding to a magnitude of the signal generated thereby.

5. The apparatus of claim 4 further comprising:

a display communicating with the displacement detector and displaying numerical values corresponding to the displacement output.

6. The apparatus of claim 3 further comprising:

a reference displacement amount setter that sets a reference displacement amount and communicates the displacement amount to the displaceable laser light detector using a displacement signal which is transmitted to the servo which moves the recording lens to an optimum focusing position.

7. The apparatus of claim 6 further comprising:

an automatic displacement amount adjustor to automatically adjust the displaceable laser light detector so that a displacement output from the displacement laser light detector coincides with the reference displacement amount from the reference displacement amount setter so that a displacement signal is transmitted to the servo to adjust the recording lens to achieve an optimum focusing position.

* * * * *

UNITED STATES PATENT AND TRADEMARK OFFICE
CERTIFICATE OF CORRECTION

PATENT NO.    : 6,211,900 B1
DATED         : April 3, 2001
INVENTOR(S)   : Hideaki Yamada It is certified that error appears in the above-identified patent and that said Letters Patent is hereby corrected as shown below:

Column 3,
Lines 24 and 28, "bits" should be -- pits --.

Column 5,
Line 55, delete the period after "postion".

Column 6,
Line 20, "(The" should be -- The --.
Line 66, "of" should be -- as --.

Column 8,
Line 9, "ben" should be -- been --.

Column 10,
Lines 25, 30, 33, 37, 41, 45, 47, and 60, "bits" should be -- pits --.

Signed and Sealed this

Thirteenth Day of November, 2001

Attest:

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO.   : 6,211,900 B1
DATED        : April 3, 2001
INVENTOR(S)  : Hideaki Yamada et al.

It is certified that error appears in the above-identified patent and that said Letters Patent is hereby corrected as shown below:

<u>Title page,</u>
Item [30], "PCT/JP98/03750" should be -- PCT/JP97/03750 --

Signed and Sealed this

Eighteenth Day of March, 2003

JAMES E. ROGAN
*Director of the United States Patent and Trademark Office*